(12) United States Patent
Landphair et al.

(10) Patent No.: US 7,765,943 B2
(45) Date of Patent: Aug. 3, 2010

(54) DUAL FUNCTION SEED METER

(75) Inventors: Donald Keith Landphair, Bettendorf, IA (US); Donald Raymond Wisor, Moline, IL (US); Jeffrey Schick, Spirit Lake, IA (US); James I. Lodico, Hampton, IL (US)

(73) Assignee: Deere & Company, Moline, IL (US)

( * ) Notice: Subject to any disclaimer, the term of this patent is extended or adjusted under 35 U.S.C. 154(b) by 167 days.

(21) Appl. No.: 11/843,056

(22) Filed: Aug. 22, 2007

(65) Prior Publication Data

US 2009/0050035 A1 Feb. 26, 2009

(51) Int. Cl.
*A01C 7/00* (2006.01)
*A01C 9/00* (2006.01)
(52) U.S. Cl. ...................... 111/182; 111/178
(58) Field of Classification Search .......... 111/170–185
See application file for complete search history.

(56) References Cited

U.S. PATENT DOCUMENTS

| | | | | |
|---|---|---|---|---|
| 1,184,894 A * | 5/1916 | Newton | ...................... | 451/105 |
| 3,486,659 A | 12/1969 | Beebe et al. | | |
| 3,489,321 A | 1/1970 | Kirschmann | | |
| 3,552,601 A | 1/1971 | Hansen et at. | | |
| 3,763,797 A | 10/1973 | Navasero | | |
| 4,282,985 A | 8/1981 | Yamamoto | | |
| 4,503,803 A * | 3/1985 | Barnes | ...................... | 118/303 |
| 4,609,131 A * | 9/1986 | Tieben | ...................... | 222/278 |
| 4,924,786 A | 5/1990 | Keeton | | |
| 5,027,725 A | 7/1991 | Keeton | | |
| 5,058,766 A | 10/1991 | Deckler | | |
| 5,996,515 A | 12/1999 | Gregor et al. | | |
| 6,308,645 B1 | 10/2001 | Newkirk et al. | | |
| 6,352,042 B1 | 3/2002 | Martin et al. | | |
| 7,428,874 B2 * | 9/2008 | Jones et al. | ................. | 111/182 |

OTHER PUBLICATIONS

1240 John Deere Planter Picture, John Deere.

* cited by examiner

*Primary Examiner*—Christopher J. Novosad

(57) ABSTRACT

A seed meter comprises a plastic casing defining a volumetric compartment and a singling compartment. The casing has three basic parts including the singling side, the volumetric side and the center portion. The basic parts are held together by integrally molded fastening assemblies. A slidable gate is mounted to two channels in the center portion for selectively directing seed into one of the two compartments. A metering drum having a volumetric section located in the volumetric compartment and a singling section located in the singling compartment is rotationally mounted to the casing. The metering drum is also plastic with each section comprising two identical pieces that can be mounted around a drive shaft.

25 Claims, 9 Drawing Sheets

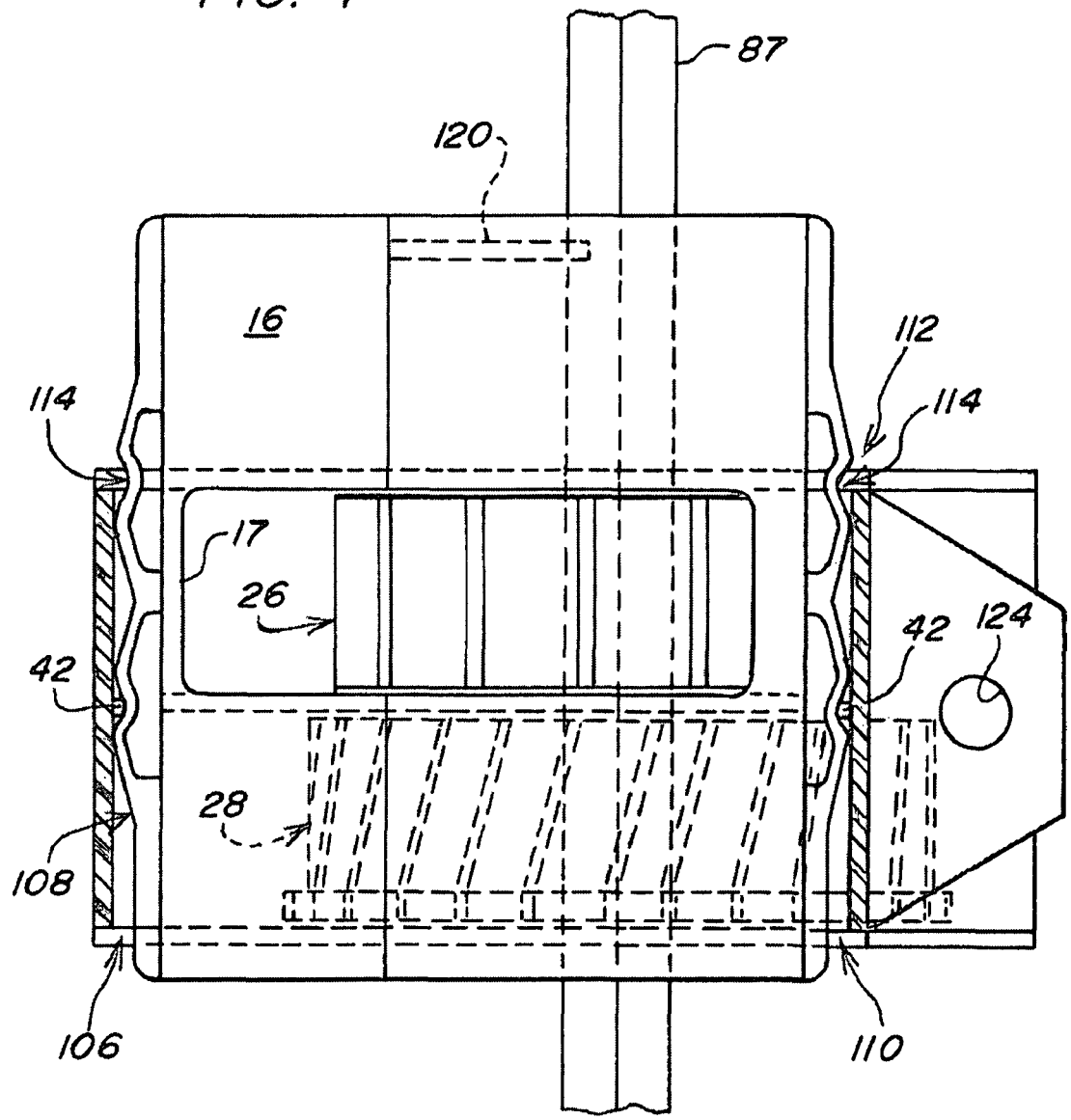

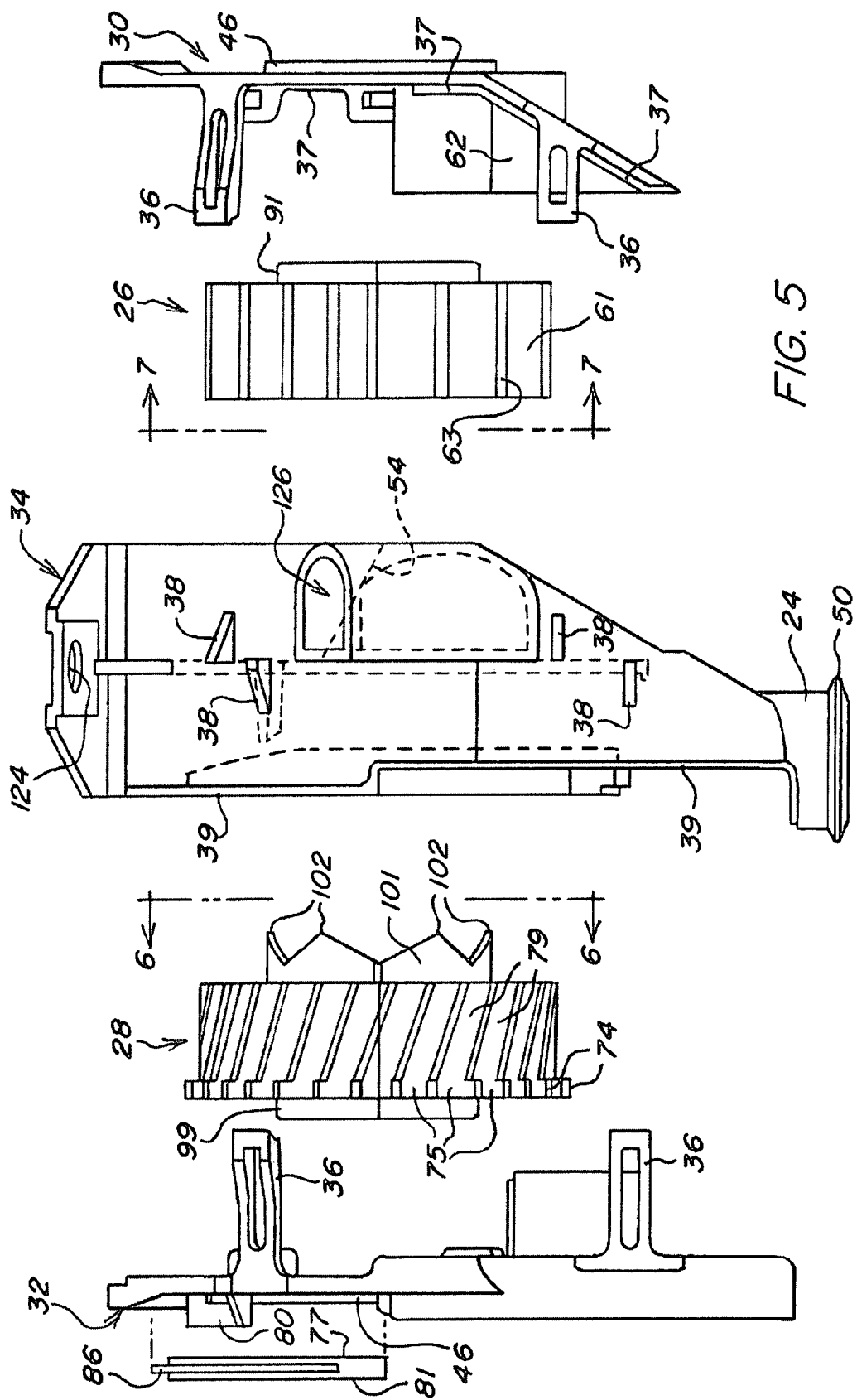

DUAL FUNCTION SEED METER

FIELD OF THE INVENTION

The present invention is directed to a mechanical seed meter which can be used on planters, grain drills and air seeders.

BACKGROUND OF THE INVENTION

In the United States the vast majority of crops are planted with row crop planters, grain drills or air seeders. Row crop planters are designed to place seeds in rows far enough apart to permit the control of weeds by cultivation and to improve harvesting efficiency. Grain drills and air seeders are used in solid planting, when row spacing is too close to permit cultivating or other cultural practices.

All three seeding machines, meter seed so it can be planted uniformly in a field. The row crop planters usually have the more sophisticated metering equipment for singling seeds, whereas the drills and air seeders use volumetric meters which apply a fixed volume of seed per linear foot. Volumetric meters typically comprise fluted drums which rotate through the seed reservoir, as illustrated in U.S. Pat. Nos. 3,489,321 and 3,763,797. Of particular interest is U.S. Pat. No. 3,489,321 which discloses a metering drum having helical flutes.

Singling mechanical seed meters used on planters include seed plate meters, finger pickup meters and "brush meters". A seed plate seed meter is a mechanical seed meter having a rotating plate located at the bottom of the seed hopper. The plate is provided with seed cells in which the seed is trapped. If the cells are the correct size, only one seed will be trapped in each cell. The plate is then rotated over the discharge area and the seed released. U.S. Pat. Nos. 3,486,659, 4,282,985, and 4,609,131 disclose various configurations for seed plate type seed meters. Of particular interest is U.S. Pat. No. 4,609,131 which is a hybrid seed dispensing device also having a fluted drum for dispensing seed volumetrically.

Another mechanical seed meter is the finger pickup seed meter. This meter is used for corn and comprises a series of fingers that pass through the seed reservoir. The fingers are initially open in the seed reservoir and then close trapping seed between the fingers and a stationary plate. Additional seed trapped by the fingers is removed by passing the fingers over indentations in the stationary plate as the seed is transported to the discharge area where the finger is opened releasing the seed. One example of a finger pickup meter is disclosed in U.S. Pat. No. 3,552,601

Recently "brush meters" have been used for metering soybeans. A vertical rotating seed plate having a plurality of seed cells around its periphery passes through the seed reservoir. Seed is trapped in the seed cells by brushes. Examples of "brush meters" are disclosed in U.S. Pat. Nos. 4,924,786, 5,027,725 and 5,058,766.

SUMMARY OF THE INVENTION

It is an object of the present invention to provide a simple mechanical seed meter that can be selectively switched to singling seeds or volumetrically metering seeds. The subject seed meter can be used on row crop planters, grain drills and air seeders.

The seed meter of the present invention comprises a casing, a metering drum and a slidable gate. The casing defines a volumetric compartment and a singling compartment. The casing is also provided with an inlet to which the slidable gate is mounted. The slidable gate is provided with an opening for selectively directing seeds to either the volumetric compartment or the singling compartment. An outlet in the casing downstream from the volumetric and the singling compartments dispenses metered seed from the meter. As with the casing, the metering drum is divided into two sections, (1) a volumetric section is rotatively positioned in the volumetric compartment, and (2) a singling section is rotatively positioned in the singling compartment.

The volumetric section of the drum is provided with radially extending flutes defining seed receiving valleys. The volumetric compartment is provided with a flexible and resilient flow control member that divides the volumetric compartment into a seed dispensing space and a seed receiving space. The control member controls the amount of seed in the seed receiving valleys before they are released to the outlet.

The singling section of the drum is provided with radially extending angled flutes defining seed receiving valleys. The flutes extend transversely into outwardly extending fingers that define seed receiving pockets. A flexible isolator divides the space between the metering drum and the casing into a seed receiving space and a seed dispensing space. The flexible isolator comprises a dividing comb having urethane tines. The upstream section of the dividing comb is tapered to drive excess seed away from the seed dispensing space. A holding comb holds the seed in the seed pockets as the pockets rotate from the seed receiving space to the seed dispensing space. After the seed reaches the seed dispensing space the holding comb ends and the seed is released to the outlet. A flexible and resilient flow regulating member extends transversely across the seed receiving space adjacent to the tapered portion of the dividing comb. A sealing comb extends between the dividing comb and the casing wall immediately downstream from the outlet to prevent seed from short circuiting the meter and entering the outlet directly.

The outer wall of the singling casing is provided with an adjustable portion that forms the outer wall of the seed dispensing space. More specifically, the width of the seed dispensing space can be adjusted to accommodate different sized seeds. The adjustable portion comprises a semi-circular insert that can be reversed to provide for different sized seeds.

BRIEF DESCRIPTION OF THE DRAWINGS

FIG. 2A is a partial cross sectional view taken along line 2A-2A illustrating the overlapping ridges 37 and 39.

FIG. 4 is a cross sectional top view of the present seed meter.

FIG. 5 is an exploded view of the present seed meter.

DESCRIPTION OF THE PREFERRED EMBODIMENT

Figure 1:
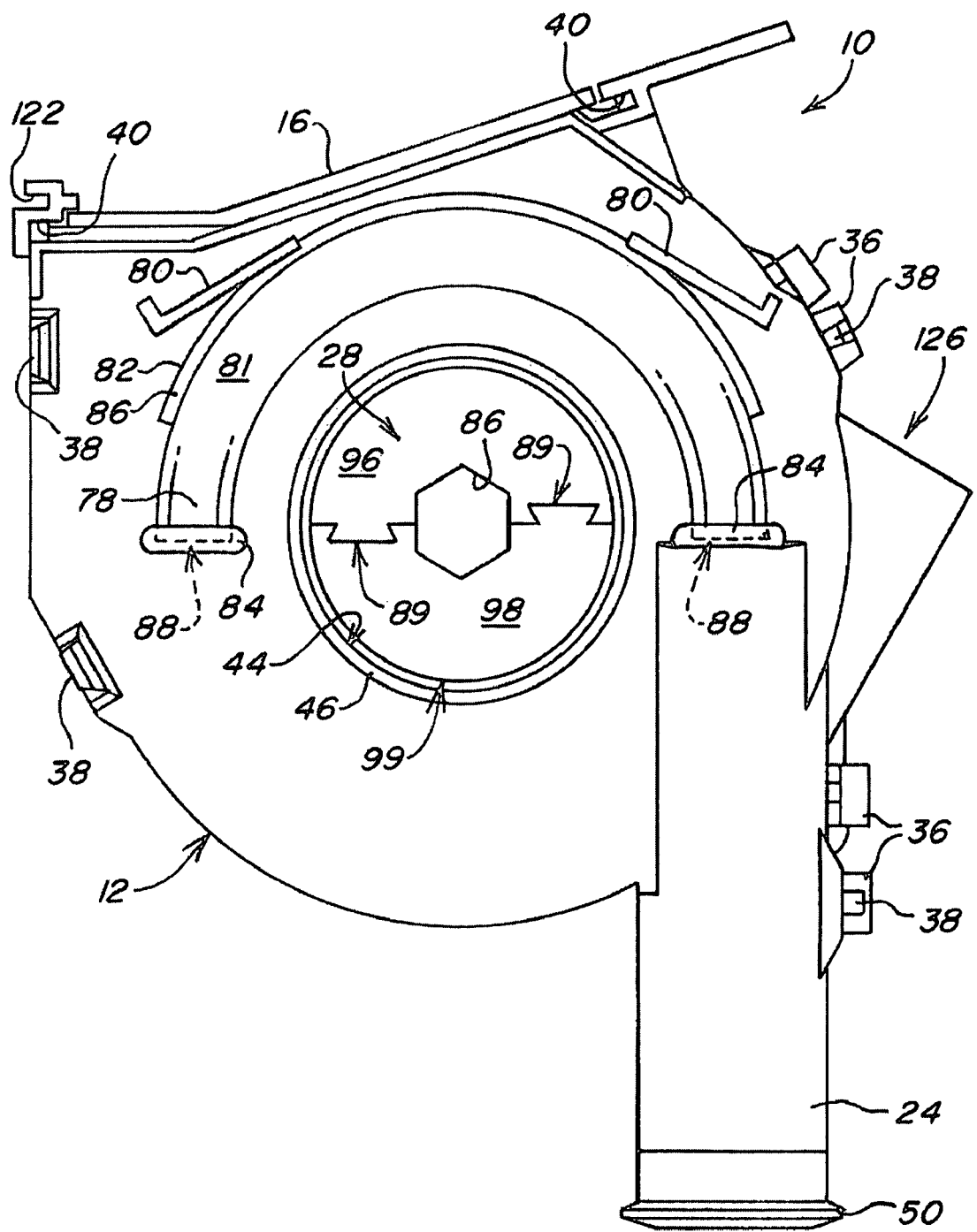
FIG. 1 is a side view of the present seed meter.
Figure 2:
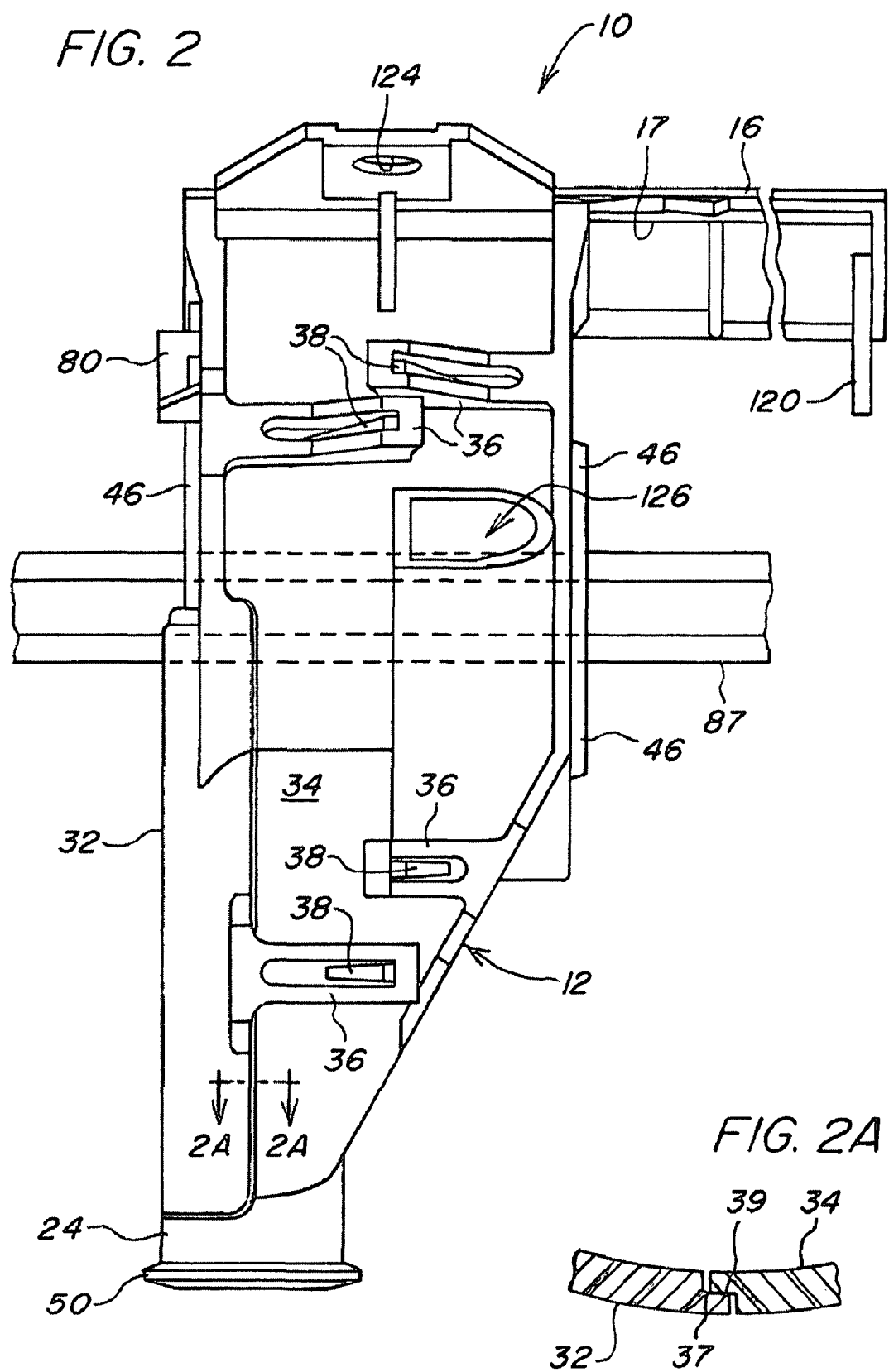
FIG. 2 is a front view of the present seed meter.
Figure 3:
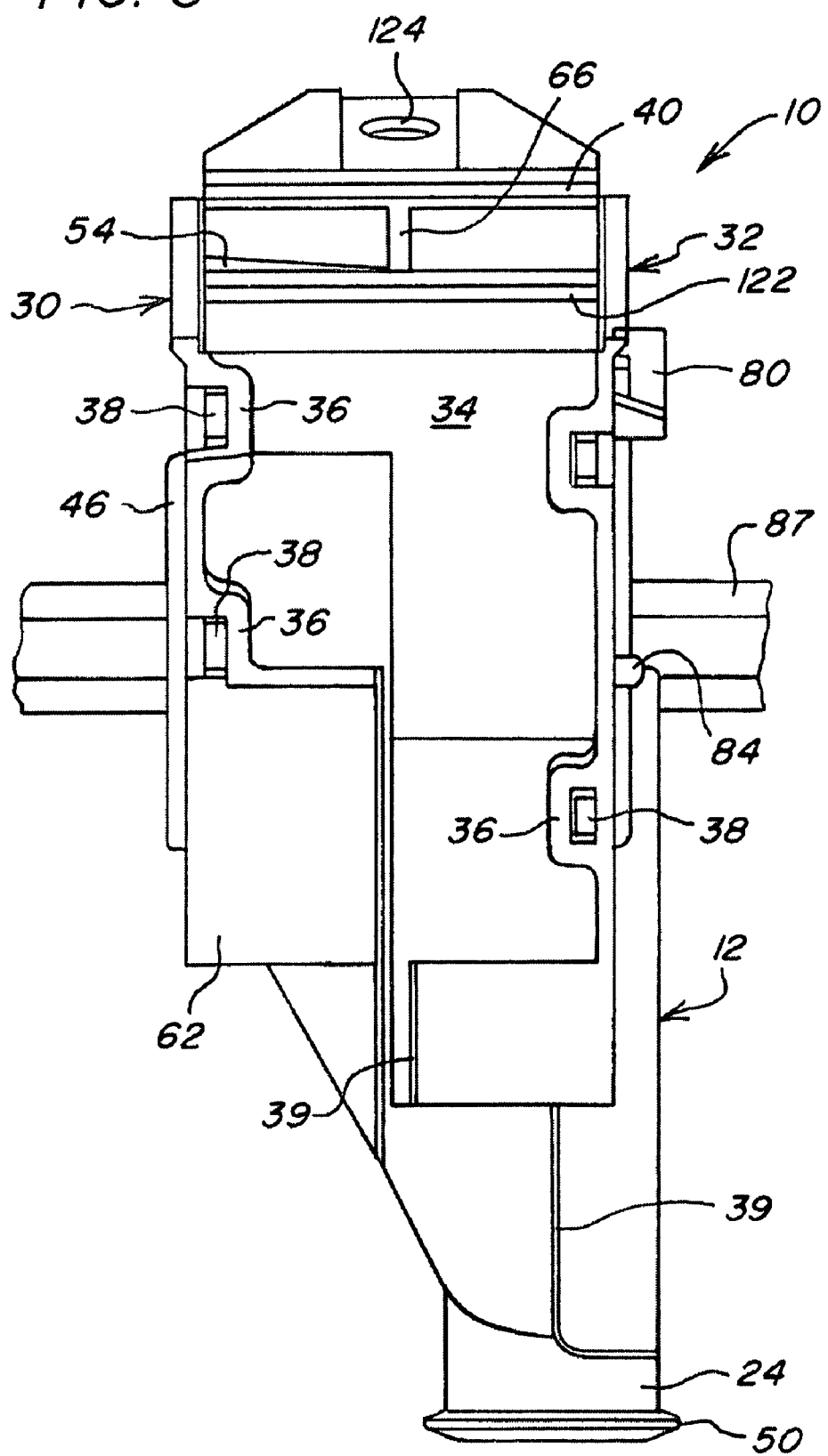
FIG. 3 is a rear view of the present seed meter with the slidable gate removed.
Figure 7:
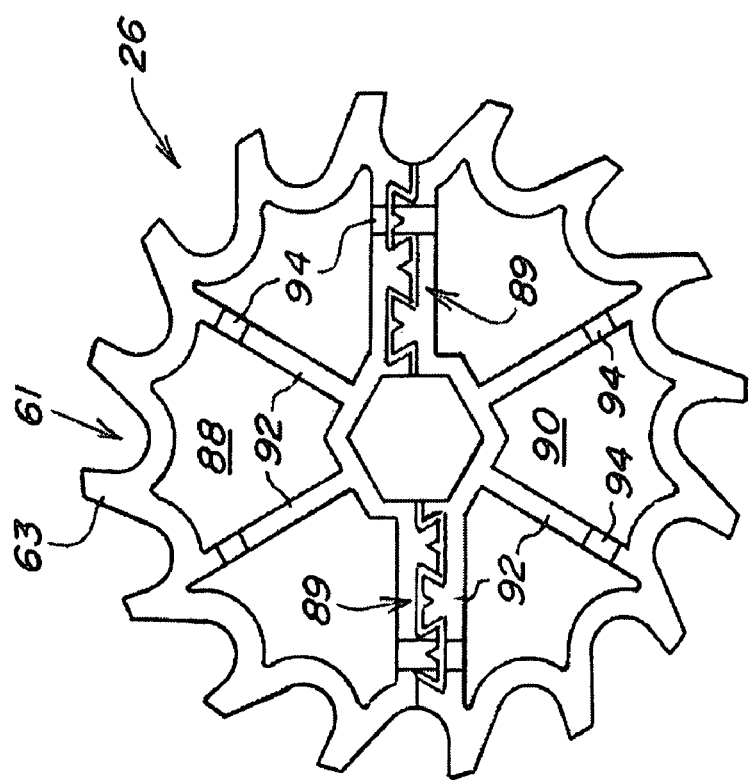
FIG. 7 is a side view of the volumetric section of the metering drum.
Figure 6:
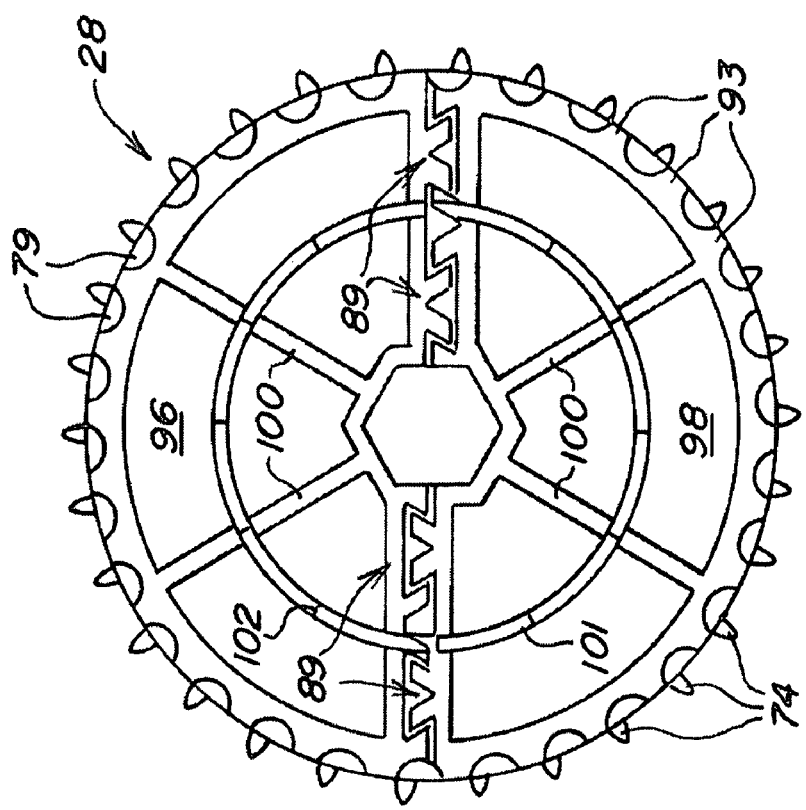
FIG. 6 is a side view of the singling section of the metering drum.
Figure 8:
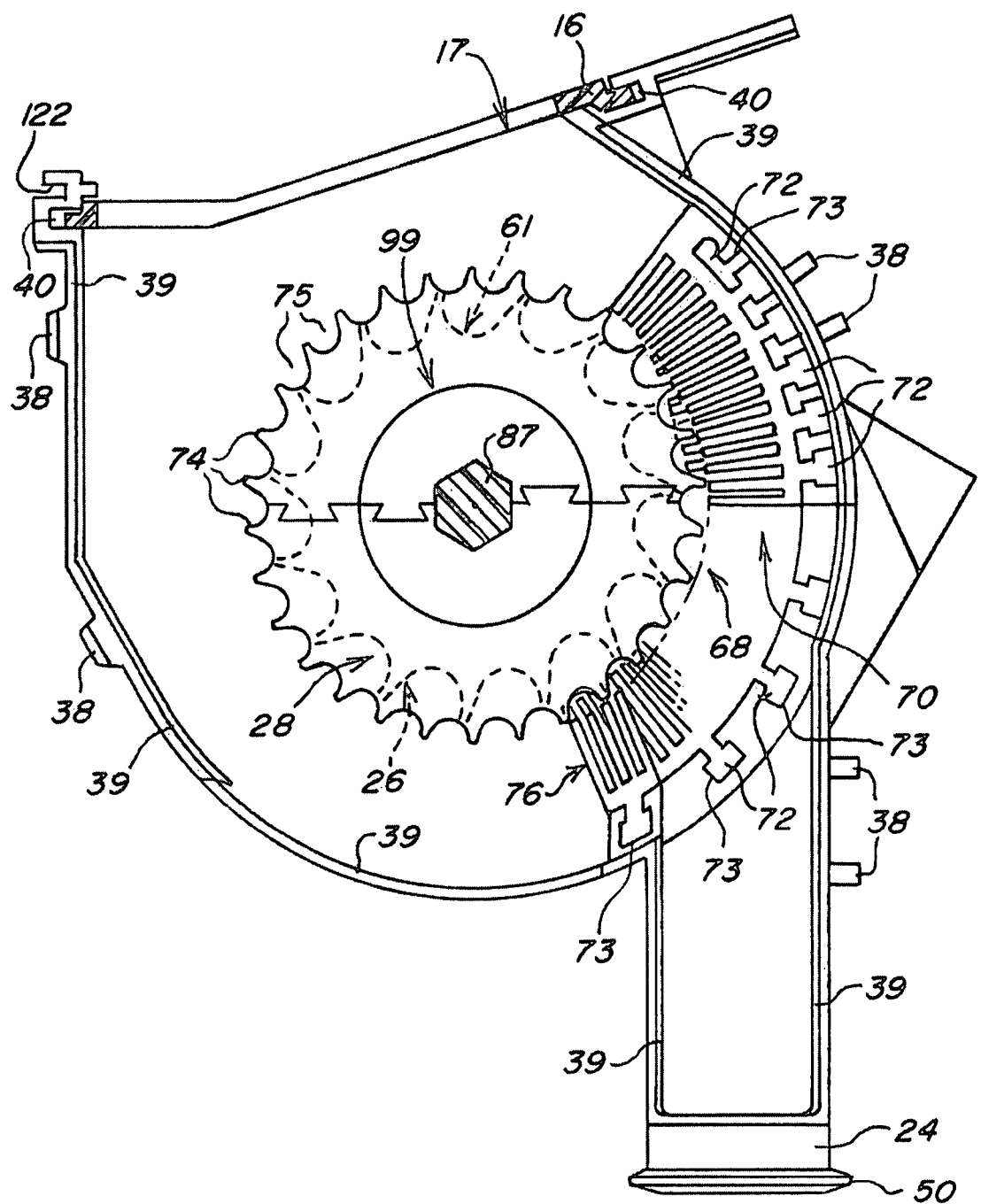
FIG. 8 is a cross sectional side view of the present seed meter.
Figure 9:
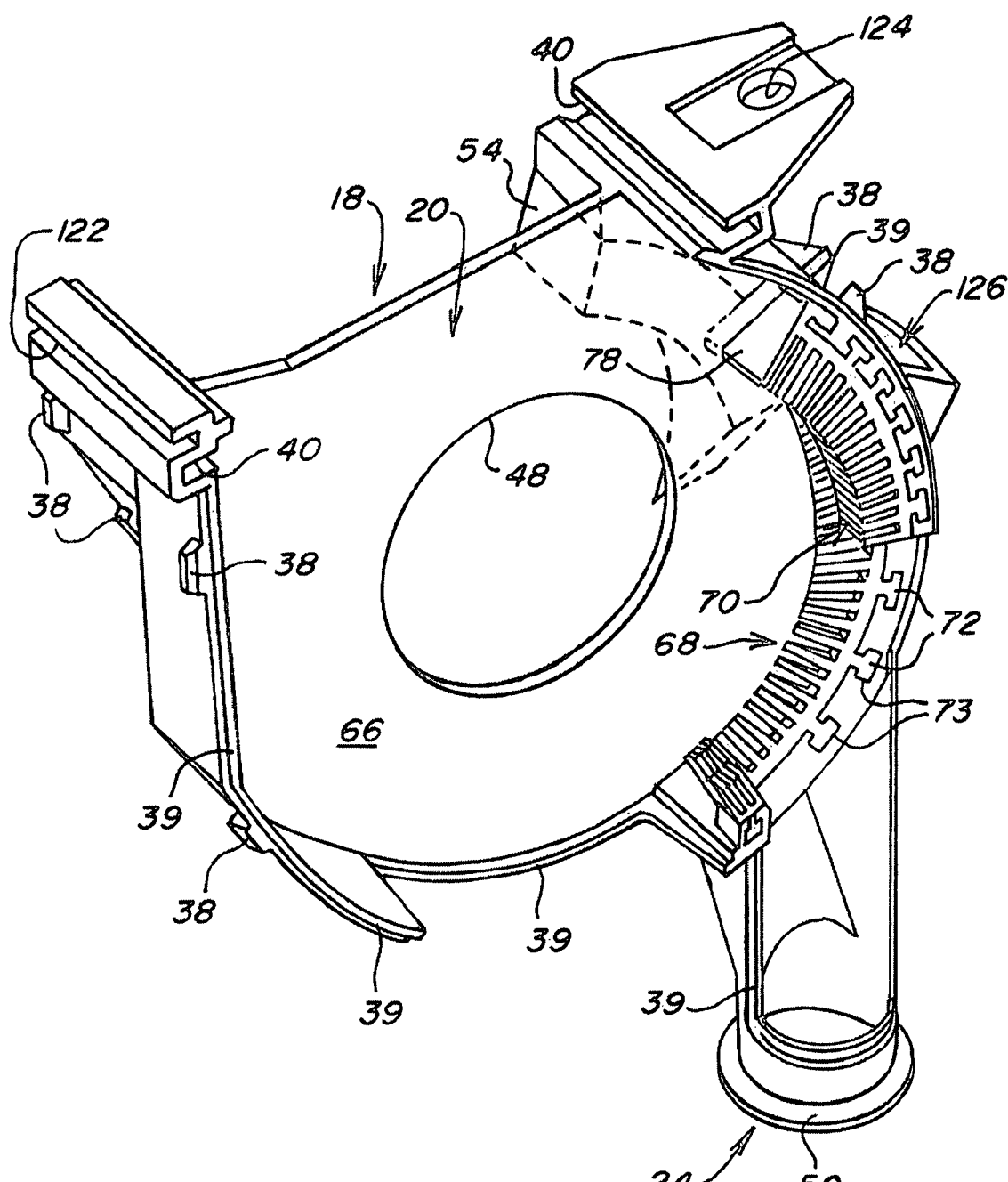
FIG. 9 is a perspective view of the center portion of the present seed meter showing the singling compartment.
Figure 10:
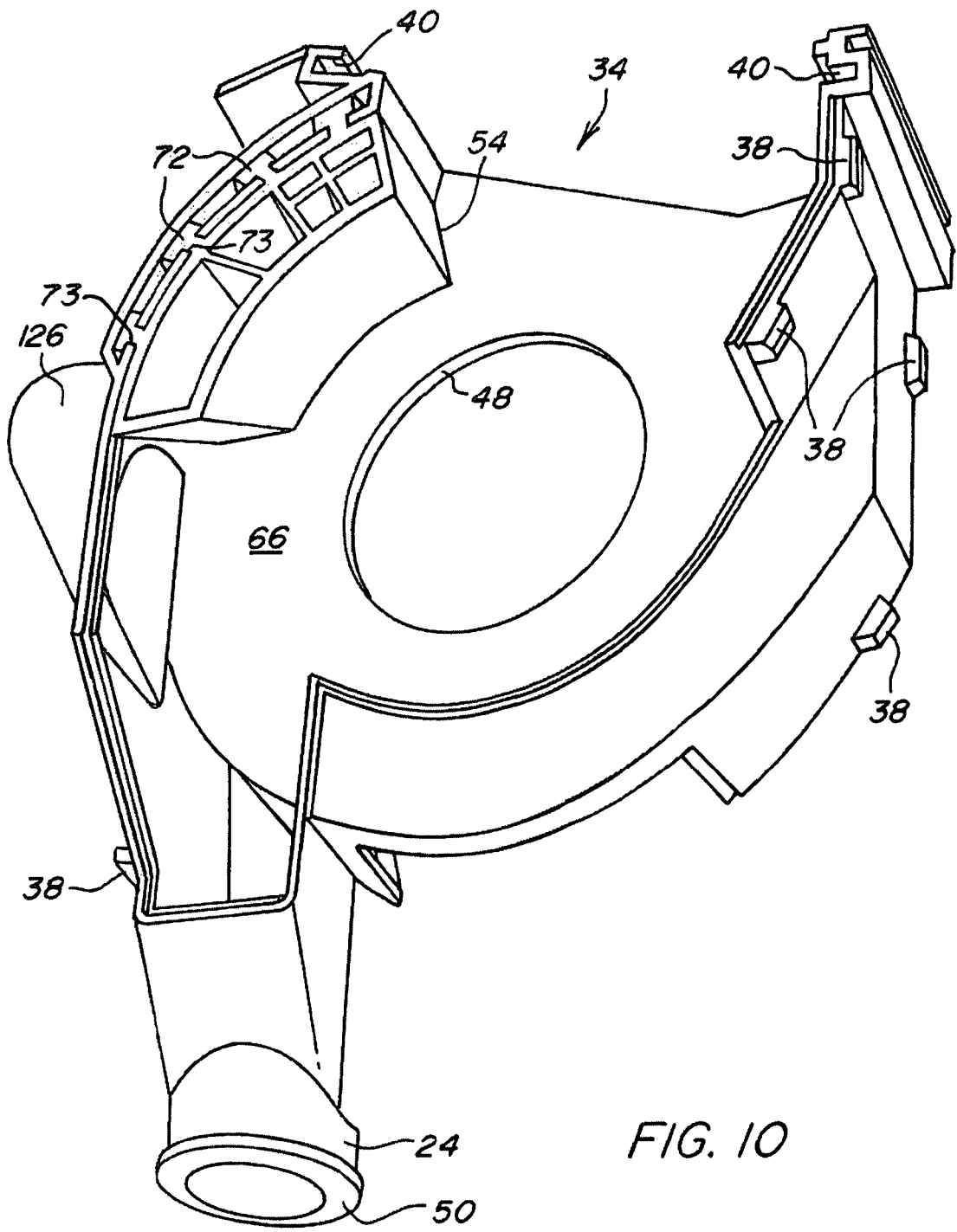
FIG. 10 is a perspective view of the center portion of the present seed meter showing the volumetric compartment.

The seed meter 10 of the present invention comprises a casing 12, a metering drum 14 and a slidable gate 16 having an opening 17. The casing 12 defines a first volumetric compartment 18 and a second singling compartment 20. Each compartment is provided with an inlet through which the slidable gate 16 selectively directs seed. An outlet 24 in the casing downstream from the volumetric and the singling compartments 18 and 20 dispenses metered seed from the meter 10. As with the casing 12, the metering drum 14 is divided into two sections, (1) a volumetric section 26 is rotationally positioned in the volumetric compartment 18, and (2) a singling section 28 is rotationally positioned in the singling compartment 20.

The basic casing 12 comprises three plastic parts, (1) a volumetric side 30 corresponding to the volumetric compartment 18, (2) a singling side 32 corresponding to the singling compartment, and (3) the center portion 34 defining the shared common wall of the volumetric and singling compartments 18 and 20. The volumetric side 30 and the singling side 32 are provided with integrally molded resilient fastening assemblies 36 which engage protuberances 38 extending outwardly from the center portion 34. The volumetric and singling sides 30 and 32 are provided with inwardly extending ridges 37 which overlap similar ridges 39 on the center portion 34 for sealing the meter 10.

The top of the center portion 34 is provided with two transverse channels 40 for receiving the slidable gate 16. The center of each channel is provided with an inwardly projecting nib 42 for holding the slidable gate in its selected position. The volumetric and singling sides 30 and 32 are provided with circular apertures 44. The apertures 44 are provided with an axially extending rim 46 forming a bearing surface for the metering drum 14. The center portion 34 is also provided with a circular aperture 48 through which the metering drum 14 extends. The internal edge of aperture 48 forms a bearing surface for the metering drum 14. The outlet 24 is provided with an outward extending lip 50 to which a seed tube, not shown, is coupled.

The volumetric compartment 18 of the center portion 34 is provided a series of transversely extending slots 52 around a portion of its periphery. A flexible and resilient urethane flow control member 54 having upstanding T-shaped mounting structures 56 is slid onto these slots and trapped therein when volumetric side 30 is fastened to the center portion 34. The flow control member 54 defines the seed receiving space and the seed dispensing space of the volumetric compartment 18. Seed passing through the opening 17 in the slidable gate 16 form a seed puddle around the metering drum 14. As the metering drum 14 is rotated counterclockwise seed is captured in the seed receiving valleys 61 defined by the radially extending flutes 63 of the metering drum 14 and transported from the seed receiving space 58 into the seed dispensing space 60. Flow control member 54 prevents excess seed from entering the seed dispensing space 60. As the seed passes into the seed dispensing space 60 it is released by the control member 54 and falls through the outlet 24. Seed is prevented from short circuiting the meter 10 by arranging the bottom wall 62 in close proximity to the top of the radially extending flutes 63 thereby forming a barrier to short circuiting.

The part forming the flexible and resilient control member 54 is provided with a transversely extending tang 78 that is inserted through the double T-opening which is located in dividing wall 66 of the center portion 34. This tang 78 forms a flexible and resilient flow control member in the singling compartment 20 into which it passes. The singling compartment 20 is provided with a dividing comb 68 and a holding comb 70. These combs are integrally formed of urethane and are provided with a series of T-shaped mounting structures 72. These mounting structures are slid into T-shaped slots 73 formed in a portion of the outer periphery of the center portion 34. The holding comb 70 corresponds to the outwardly extending fingers 74 that define seed receiving pockets 75. The holding comb defines the seed dispensing space and holds singled seeds in the seed receiving pockets 75. The dividing comb 68 is provided with an angled upstream portion which drives excess seed away from the seed receiving pockets 75. The tines of the dividing comb 68 are longer than the tines of the holding comb 70 and extend into the seed receiving valleys 79. After the seed reaches the seed dispensing space 73 the holding comb 70 ends and the seed is released to the outlet 24. A sealing comb 76 extends between the dividing comb 68 and the inner surface of the singling side 32 immediately downstream from the outlet 24 to prevent seed from short circuiting the meter 10 and entering the outlet 24 directly.

The singling section 32 is provided with a semi-circular insert 78. This insert can be reversed to adjust the width of the seed receiving cells. The first side 77 of the insert 78 is flush with the inner surface of the singling side 32, whereas the second side 81 is recessed away from the inner surface to accommodate larger seeds. This insert 78 is held in place by resilient trapping elements 80, recessed channel 82 and stationary trapping elements 84. The insert 78 itself is provided with radially extending flange 86 which is received by the recessed channel 82. In mounting the insert 78 to the singling cover, the open ends 88 of the insert 78 are first inserted into stationary trapping elements 84 and then the resilient trapping elements 80 are pulled back until the radially extending flange rests against the recessed channel 82. The resilient trapping elements 80 are then released trapping the insert in place.

The metering drum 14 has a volumetric section 26 and a singling section 28. The metering drum 14 is driven by a hexagonal drive shaft 87 passing through hexagonal aperture 86. The volumetric section 26 has a series of radially extending flutes 63 that define seed receiving valleys 61. The volumetric section 26 is a two piece plastic drum. Both pieces 88 and 90 are identical and maybe removed from the hexagonal drive shaft without removing the shaft. The pieces 88 and 90 are joined together by dovetail joints 89. The outer surface of the volumetric section 26 is provided with a transversely extending circular rim 91 which bears against the inner circular edge of the aperture 44. The inner surface of the volumetric section 26 is provided with a series of radially extending reinforcements 92. Each of the reinforcements is provided with a small notch 94.

The singling section 28 has a series of radially extending angled flutes 93 that terminate in radially extending fingers 74. The flutes 93 defining seed receiving valleys 79 and the fingers 74 defining the seed receiving pockets 75. As with the volumetric section 26, the singling section 28 is a two piece plastic drum. Both pieces 96 and 98 as identical and maybe removed from the hexagonal shaft. The pieces 96 and 98 are joined together by dovetail joints 89. The outer surface of the singling section 26 is provided with a bearing surface comprising transversely extending circular rim 99 which bears against the inner circular edge of the aperture 48. The inner surface is provided with a series of radially extending reinforcements 100. The inner surface is also provided with a inwardly extending sleeve 101 having an annular set of triangular teeth 102. These teeth ride in the small notches 94 on the volumetric section 26 of the metering drum 14.

The slidable gate 16 has a first outer edge 106 having a first resilient latch mechanism 108, and a second outer edge 110 having a second resilient latch mechanism 112. The latch mechanisms 108 and 112 are identical and are provided with detents 114 that cooperate with the nibs 42 located in each of the channels 40 to latch the slidable gate 16 into a volumetric position or a singling position. In the volumetric position, the gate 16 is positioned to block the flow of seed into the singling compartment 20 and allow the flow of seed through opening 17 into the volumetric compartment 18. In the singling position the opposite happens, and the flow of seed is blocked from the volumetric compartment 18 and is passed into the singling compartment 20. The slidable gate is also provided with a downward depending grip 120 which is grabbed by the operator when shifting the slidable gate 16.

The center portion 34 of the casing is also provided with a mounting channel 122 which engages the frame of a seeding machine. An aperture 124 receives a mounting bolt, not shown, for securing the seed meter to the seeding machine frame.

The center portion 34 of the casing 12 is also provided with an opening 126 for receiving and directing fertilizer and other chemicals to the seed planting furrow during seeding operations.

Having described the preferred embodiment, it will become apparent that various modifications can be made without departing from the scope of the invention as defined in the accompanying claims.

We claim:

1. A seed meter for metering seeds for a piece of seeding equipment, the seed meter comprising:
    a casing having a volumetric compartment, a singling compartment and an outlet for dispensing seed;
    a slidable gate positioned upstream from the compartments for selectively directing seed into one of the two compartments;
    a metering drum having a volumetric section located in the volumetric compartment and a singling section located in the singling compartment, the metering drum is rotatively mounted to the casing, the singling section and the volumetric section directing metered seed to the outlet.

2. A seed meter as defined by claim 1 wherein the volumetric section of the metering drum is provided with a series of radially extending flutes defining seed receiving valleys.

3. A seed meter as defined by claim 2 wherein the volumetric compartment of the casing is provided with a flexible and resilient flow control member which controls the amount of seed in the seed receiving valleys of the volumetric section of the metering drum.

4. A seed meter as defined by claim 3 wherein the singling section of the metering drum is provided with a series of radially extending angled flutes that terminate in radially extending fingers, the fingers defining single seed receiving pockets.

5. A seed meter as defined by claim 4 wherein the singling compartment of the casing is provided with a dividing comb for singling seed and a holding comb for holding singled seed in the seed receiving pockets.

6. A seed meter as defined by claim 5 wherein the singling compartment of the casing is further provided with a sealing comb which prevents seed from short circuiting the meter and directly entering the outlet.

7. A seed meter as defined by claim 6 wherein the slidable gate has a latch mechanism for latching the slidable gate in either a volumetric position wherein seed is directed to the volumetric compartment and blocked from the singling compartment, or a singling position wherein seed is directed to the singling compartment and blocked from the volumetric compartment.

8. A seed meter as defined by claim 7 wherein the latch mechanism is provided with at least two detents corresponding to the volumetric position and the singling position which cooperate with nibs formed in the casing for holding the slidable gate in either the volumetric position or the singling position.

9. A seed meter as defined by claim 8 wherein the slidable gate is provided with a finger grip for facilitating the movement of the slidable gate by an operator.

10. A seed meter as defined by claim 8 wherein the casing comprises a center portion, a volumetric side and a singling side, the volumetric side and the center portion defining the volumetric compartment, and the singling side and the center portion defining the singling compartment.

11. A seed meter as defined by claim 10 wherein the volumetric and singling sides and the center portion are provided with circular apertures having internal edges that form bearing surfaces for the metering drum.

12. A seed meter as defined by claim 11 wherein the singling and volumetric sides are provided with integrally molded fastening assemblies which engage protuberances molded into the center portion.

13. A seed meter as defined by claim 12 wherein the center portion is provided with two channels along which the slidable gate moves.

14. A seed meter as defined by claim 10 wherein the volumetric metering section of the metering drum comprises two identical parts that are joined together about a drive shaft.

15. A seed meter as defined by claim 14 wherein the singling metering section of the metering drum comprises two identical parts that are joined together about the drive shaft.

16. A seed meter as defined by claim 15 wherein the two identical parts of the singling section and the volumetric are joined together by dovetail joints.

17. A seed meter as defined by claim 10 wherein the singling section of the metering drum is provided with an inwardly extending sleeve having triangular teeth that engages the volumetric section of the metering drum.

18. A seed meter as defined by claim 17 wherein the volumetric section of the metering drum is provided with a series of notches which engage the inwardly extending sleeve of the singling section.

19. A seed meter as defined by claim 10 wherein the flow control member located in the volumetric compartment is provided with a tang that extends through the center portion of the casing into the singling compartment where it forms a flow control member.

20. A seed meter as defined by clam 10 wherein the singling side of the casing is provided with a semi-circular insert adjacent the seed holding comb, the semi-circular insert has a first side which is flush with the singling side and a second side having a recessed channel, the semi-circular insert can be reversed so that the first side or second side can be located in the singling compartment to accommodate different sized seed.

21. A seed meter as defined by claim 20 wherein the singling side of the casing is provided with stationary and resilient trapping elements for releasably mounting the semi-circular insert to the singling side of the casing.

22. A seed meter as defined by claim 10 wherein the sealing, dividing and holding combs are integral with one another, the combs are provided with mounting structures for mounting the combs to the casing.

23. A seed meter as defined by claim 22 wherein the center portion of the casing is provided with a series of slots for receiving mounting structures of the sealing, dividing and holding combs.

24. A seed meter as defined by claim 10 wherein the flexible and resilient flow control member located in the volumetric compartment is provided with mounting structures for mounting the flow control member to the casing.

25. A seed meter as defined by claim 24 wherein the center portion of the casing is provided with a series of slots for receiving mounting structures of the flow control member located in the volumetric compartment.

* * * * *